United States Patent
Case et al.

(10) Patent No.: US 6,847,987 B2
(45) Date of Patent: *Jan. 25, 2005

(54) SYSTEM AND METHOD FOR EXTENDING CLIENT-SERVER SOFTWARE TO ADDITIONAL CLIENT PLATFORMS FOR SERVICING THIN CLIENTS REQUESTS

(75) Inventors: Douglas Robert Case, San Jose, CA (US); Avishai Haim Hochberg, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,869

(22) Filed: Sep. 30, 1998

(65) Prior Publication Data

US 2002/0013808 A1 Jan. 31, 2002

(51) Int. Cl.[7] .............................. G06F 15/16; G06F 3/00
(52) U.S. Cl. ....................... 709/203; 709/217; 709/218; 709/219; 719/328
(58) Field of Search ................................. 709/203, 217, 709/218, 225, 229, 230, 238, 250; 719/328

(56) References Cited

U.S. PATENT DOCUMENTS

| | | | | |
|---|---|---|---|---|
| 4,949,248 A | * | 8/1990 | Caro ........................... 364/200 |
| 5,497,463 A | | 3/1996 | Stein et al. ............. 395/200.03 |
| 5,644,768 A | * | 7/1997 | Periwal et al. ............... 709/203 |
| 5,701,451 A | | 12/1997 | Rogers et al. ............... 395/600 |
| 5,706,502 A | * | 1/1998 | Foley et al. ................. 709/203 |
| 5,737,607 A | | 4/1998 | Hamilton et al. ........... 395/701 |
| 5,740,362 A | | 4/1998 | Buickel et al. ......... 395/200.03 |
| 5,761,673 A | * | 6/1998 | Bookmand et al. .......... 707/104 |
| 5,999,930 A | * | 12/1999 | Wolff ............................. 707/8 |
| 6,026,404 A | * | 2/2000 | Adunuthula et al. .......... 707/10 |
| 6,061,740 A | * | 5/2000 | Ferguson et al. ............ 709/206 |
| 6,101,491 A | * | 8/2000 | Woods ........................... 707/3 |

\* cited by examiner

Primary Examiner—Marc D. Thompson
Assistant Examiner—Beatriz Prieto
(74) Attorney, Agent, or Firm—Sawyer Law Group LLP (57) ABSTRACT

A method and system for servicing a request using a server is disclosed. The server is capable of communicating with a client. The client provides a plurality of functions. The method and system include providing a thin client for providing the request. The thin client is compatible with at least one client platform. The method and system also include providing a listening program. The listening program is for listening for the request from the thin client and invoking the client. A portion of the plurality of functions may be provided on the at least one client platform. In another aspect, the thin client is further compatible with a plurality of client platforms. The request may be from one of the plurality of client platforms.

30 Claims, 9 Drawing Sheets

SYSTEM AND METHOD FOR EXTENDING CLIENT-SERVER SOFTWARE TO ADDITIONAL CLIENT PLATFORMS FOR SERVICING THIN CLIENTS REQUESTS

FIELD OF THE INVENTION

The present invention relates to client-server software and more particularly to a method and system for providing a client which can be more easily extended for use on a variety of platforms.

BACKGROUND OF THE INVENTION

Conventional client-server software allows conventional clients residing on a client machine to access the functions provided by a server residing on a server machine. For example, some conventional client-server software provides backup and restore of data residing on client machines. In order to backup data, software residing on a client machine or a user utilizing the client machine invokes the conventional client. The conventional client then requests the conventional server to back up the data and passes the data to the conventional server. The conventional server stores the data and provides a response to the conventional client indicating that the data has been successfully stored. When the data is to be restored, the conventional client sends a request for the data to the conventional server. In response, the conventional server provides a copy of the stored data to the conventional client.

It is often desirable for client-server software to work with many different client platforms or server platforms. A client platform can be viewed as a particular type of client machine or operating system. Similarly, a server platform can be viewed as a particular type of server machine. Compatibility with different platforms may be especially desirable for client platforms. This is because there is a large number of operating system platforms that users wish to have their clients on. A network may have many client machines using many different client platforms. All of these platforms are often desired to be used with the same server. Consequently, the client-server software should be compatible with all of the desired client platforms.

In order to allow the conventional client-server software to function with different client platforms, the conventional client can be ported to new client platforms. Typically, porting the conventional client entails several steps including compiling the conventional client on each new client platform, determining the errors occurring during compilation and correcting these compilation errors. Porting the conventional client further includes running an existing conventional client on each new client platform, determining the errors which result, and modifying the code for the existing conventional client until the conventional client functions correctly with each new client platform. Thus, conventional client-server software functions on multiple client platforms by providing a conventional client that has been ported to each conventional platform.

Although porting the conventional client to new client platforms allows the conventional client-server software to function with new client platforms, this process can be extremely time consuming and expensive. In addition, the porting process may need to be repeated for a new version of a client platform to which the conventional client has already been ported. The porting process may need to be repeated because there is no guarantee that the conventional client will function with certain aspects of the new version of the client platform. Thus, ensuring that the client-server software remains compatible with new versions of existing client platforms is also expensive and time consuming. In addition, new clients platforms continue to be developed. In order to allow the client-server software to be used with networks which utilize the new client platforms, the existing client must be ported to these new platforms. Thus, porting must be continually carried out to allow the client-server software to be used with newly developed client platforms.

Another conventional method of ensuring that the conventional client-server software can function with a variety of client platforms would be to provide a conventional client in a platform independent language, such as JAVA. Such a conventional client would be compatible with many client platforms. However, in order to provide such a conventional platform independent client, the conventional client would have to be rewritten in JAVA and debugged. This would require a very significant additional investment in time and resources. It would also mean that the substantial investment of time and resources in the conventional platform dependent client would be abandoned. In addition, a platform independent language such as JAVA is relatively slow. Thus, performance of a conventional client-server software having a conventional client written in JAVA may suffer. Such a JAVA client would also need a JAVA virtual machine, which executes JAVA programs. This environment may not be available on all client machines. Moreover, JAVA, like some other so-called platform independent languages, may not be fully platform independent in all cases.

Accordingly, what is needed is a system and method for more easily providing client-server software which can be compatible with other client platforms. The present invention addresses such a need.

SUMMARY OF THE INVENTION

The present invention provides a method and system for servicing a request using a server. The server is capable of communicating with a client. The client provides a plurality of functions. The method and system comprise providing a thin client for providing the request. The thin client is compatible with at least one client platform. The method and system also comprise providing a listening program. The listening program is for listening for the request from the thin client and invoking the client. A portion of the plurality of functions may be provided on the at least one client platform. In another aspect, the thin client is further compatible with a plurality of client platforms. The request may be from one of the plurality of client platforms.

According to the system and method disclosed herein, the present invention allows a plurality of client platforms to be capable of accessing the server, thereby increasing overall system adaptability.

DETAILED DESCRIPTION OF THE INVENTION

The present invention relates to an improvement in client-server communication. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
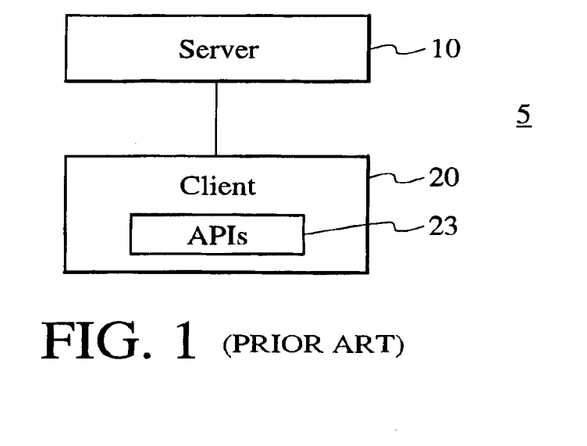
FIG. 1 is a block diagram of a conventional client-server software.

FIG. 1 is a block diagram of a conventional client-server software 5. The conventional client-server software 5 includes a conventional server 10 and a conventional client 20. The conventional server 10 typically resides on a server machine using a particular server platform. The conventional client 20 typically resides on a client machine using a particular client platform. The conventional client 20 also includes application program interfaces (APIs) 23. The APIs 23 provide a public interface for the conventional client 20. Consequently, the conventional client 20 can be invoked by other software (not shown) as well as a user. The conventional client 20 provides a plurality of functions via communication with the conventional server 10.

Figure 2A:
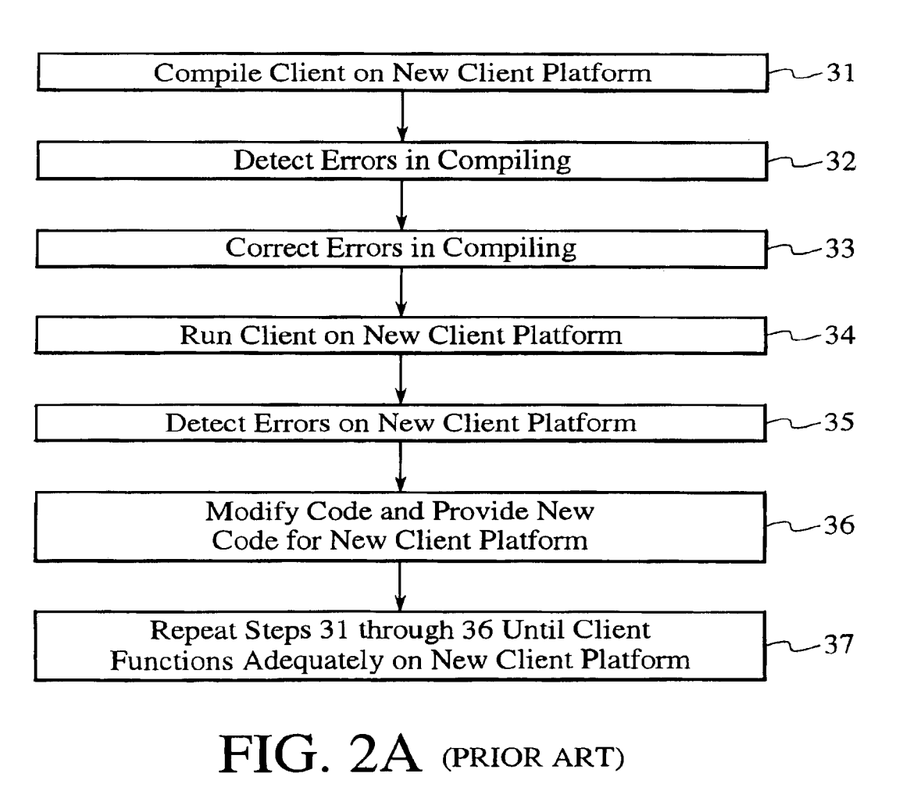
FIG. 2A is a flow chart depicting a conventional method for porting the conventional client to a new client platform.

FIG. 2A depicts a flow chart of a conventional method 30 for porting the conventional client 20 to a second client platform. Thus, the method 30 allows the conventional client-server software 5 to be used with multiple client platforms. The code for the conventional client 20 is compiled on a second client platform, via step 31. The errors which occurred during compiling are detected, via step 32. These errors are then corrected, via step 33. The compiled code for the conventional client 20 is then run on the second client platform, via step 34. The errors in the code are then detected for the second client platform, via step 35. The errors may occur for several reasons. For example, the second client platform may use a different input/output device (not shown) or file system type than the first client platform. The code for the conventional client 20 is then modified and new code developed for the second client platform, via step 36. Steps 31 through 36 are then repeated until development is complete, via step 37. Thus, the conventional client-server software 5 is made compatible with the second client platform. The method 30 can be repeated for each new client platform which is desired to be supported. Thus, using the method 30 for the each new client platform, the conventional client-server software 5 can be made compatible with multiple client platforms.

Figure 2B:
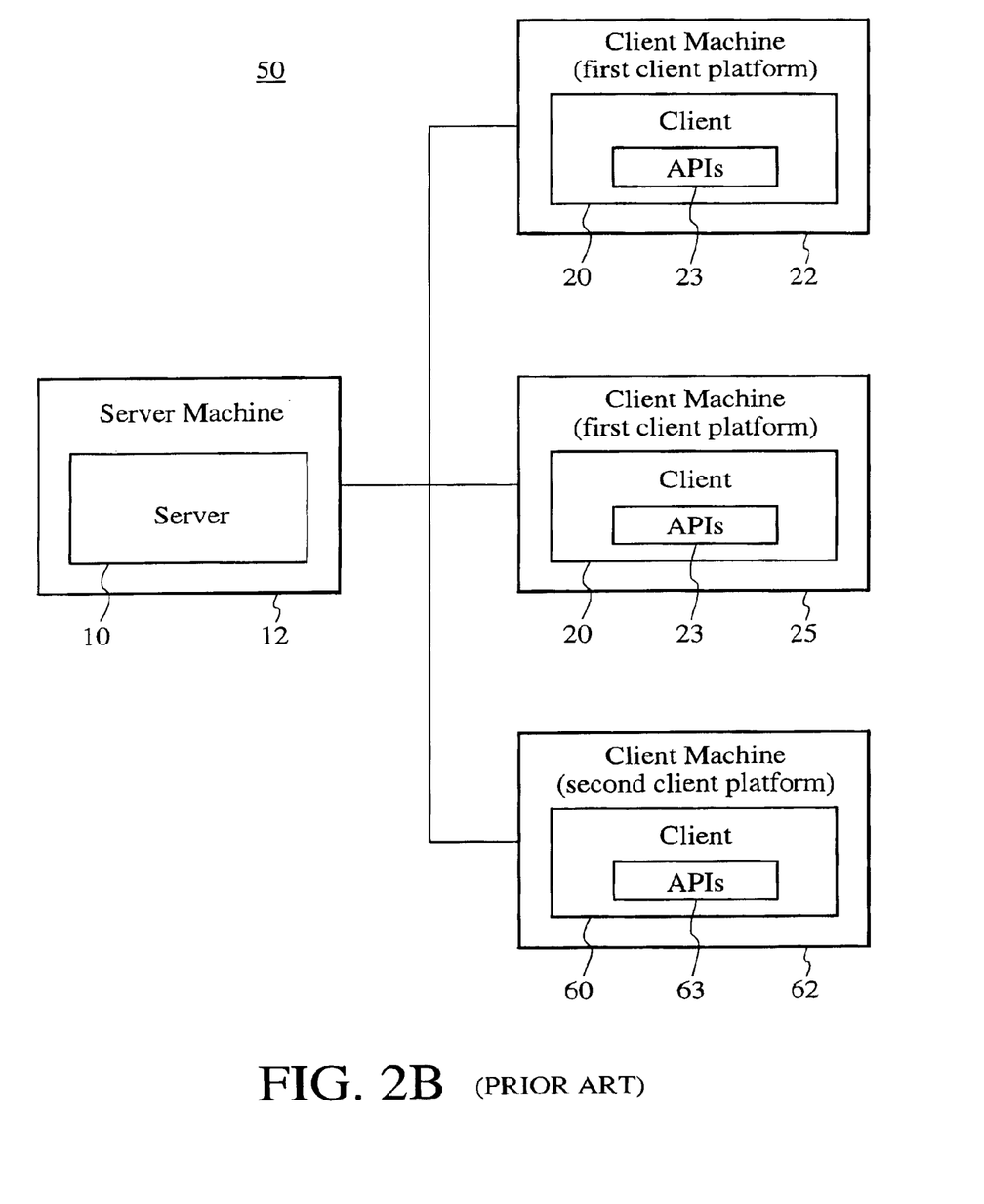
FIG. 2B is a block diagram of a conventional network utilizing a conventional client-server software.

FIG. 2B is a block diagram of a conventional network 50 using the conventional client-server software 5 in which the conventional client 20 has been ported to a new client platform using the conventional method 30. The conventional network 50 includes a server machine 12 on which the server 10 resides. The server machine 12 uses a particular server platform. The conventional network 50 also includes client machines 22, 25, and 62. The client machines 22 and 25 use a first client platform and include the conventional client 20. The client machine 62 uses a second client platform and includes a second conventional client 60. Thus, the conventional client 20 is compatible with the first client platform, while the second conventional client 60 is compatible with the second client platform. The second conventional client 60 resulted from the conventional client 20 being ported to the second client platform using the method 30.

Although the conventional client-server software 5 can be made compatible with multiple platforms using the conventional method 30, those with ordinary skill in the art will realize that the conventional method 30 is expensive and time consuming. In addition, the network 50 is shown as having only two different platforms. Many networks use a variety of client platforms. In order for the conventional client-server software 5 to be compatible with all of these platforms, the conventional client 20 must be ported to each client platform used in the network. Thus, each client platform desired to be supported requires an investment of time and resources. Moreover, new client platforms continue to be developed and used in networks. The method 30 is carried out for each new client platform. Thus, process of porting the client 20 to new client platforms does not end, requiring that additional time and resources be spent for each new client platform to be supported.

Figure 3:
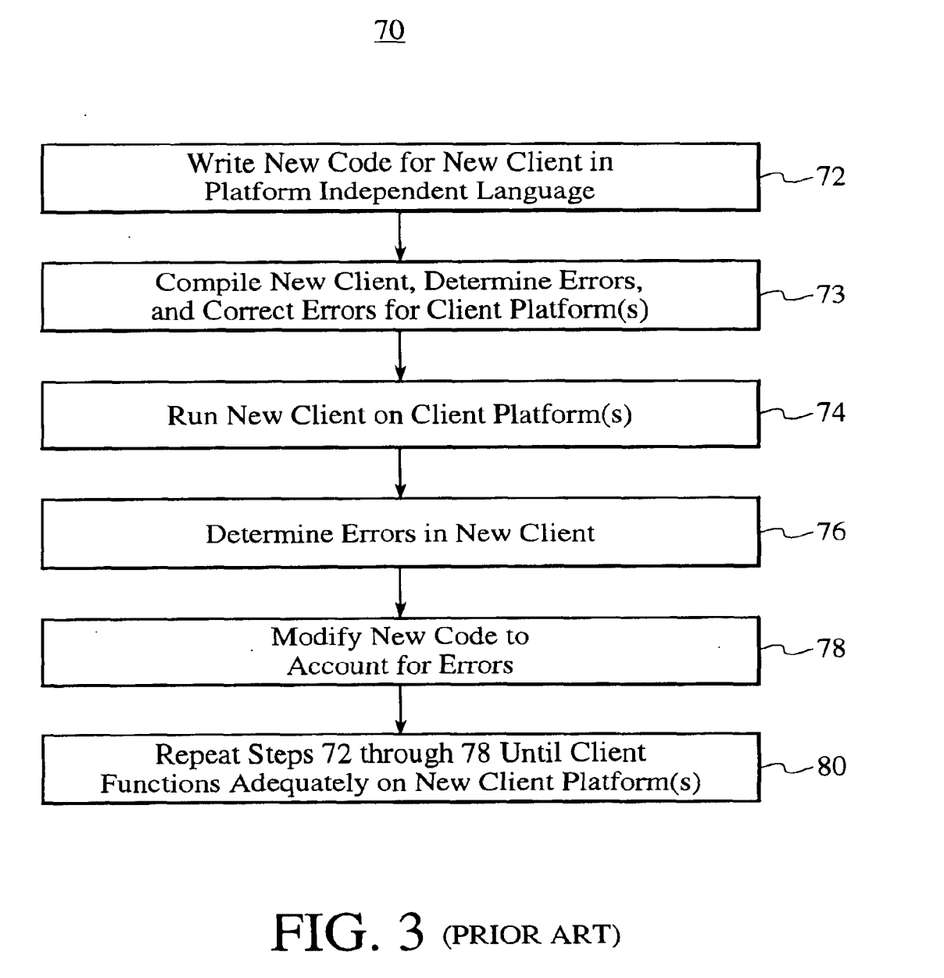
FIG. 3 is a flow chart depicting a conventional method for ensuring that the conventional client is compatible with a variety of client platforms.

FIG. 3 depicts another conventional method 70 for allowing the conventional client-server software 5 to be compatible with multiple client platforms without requiring porting using the method 30. The code for the conventional client 20 is rewritten in a platform independent language, via step 72. One platform independent language is JAVA. Thus, step 72 results in a conventional platform independent client. The conventional platform independent client is then compiled, via step 73. Also in Step 73, errors occurring during compiling are determined and corrected. The compiled conventional platform independent client is run on a client platform or platforms, via step 74. The errors occurring during running of the conventional platform independent client are then determined, via step 76. The conventional platform independent client is then modified to correct the errors, via step 78. Steps 73 through 78 are then repeated until the conventional platform independent client functions on the client platform, via step 80.

Although the method 70 provides a conventional platform independent client, one of ordinary skill in the art will realize that the conventional platform independent client has several drawbacks. The method 70 completely rewrites the conventional client 20, abandoning the conventional client 20. The conventional client 20 already functions on at least one client platform. A great deal of resources was invested in the conventional client 20. There is also a high level of knowledge about the behavior of the conventional client 20. Thus, abandoning the conventional client 20 also forsakes all of the time and resources expended on the conventional client 20. Moreover, the method 70 is itself time consuming and expensive. It may, therefore, require a significant investment before the platform independent client can adequately replace the conventional client 20. In addition, platform independent languages such as JAVA are relatively slow. Thus, a conventional platform independent client may have poorer performance than a conventional client 20. Some platform independent languages, such as JAVA, also require a particular environment. For example, JAVA utilizes a JAVA virtual machine for executing a JAVA program. These environments are not available on some client platforms or may not be truly platform independent in all cases. Therefore, the conventional platform independent client may be difficult to provide across all intended platforms.

The present invention provides a method and system for servicing a request using a server. The server is capable of communicating with a client. The client provides a plurality of functions. The method and system comprise providing a thin client for providing the request. The thin client is compatible with at least one client platform. The method and system also comprise providing a listening program. The listening program is for listening for the request from the thin client, and invoking the client. A portion of the plurality of functions may be provided on the at least one client platform. In another aspect, the thin client is further compatible with a plurality of client platforms. The request may be from one of the plurality of client platforms.

The present invention will be described in terms of a particular platform and particular functions provided in the client-server environment. However, one of ordinary skill in the art will readily recognize that this method and system will operate effectively for other types of platforms and other functions. In addition, the present invention will be described in terms of a particular number of servers, client platforms, server platforms, client machines, and server machines. However, one of ordinary skill in the art will realize that nothing prevents the method and system from use with another number of servers, client platforms, server platforms, client machines, and server machines.

Figure 4:
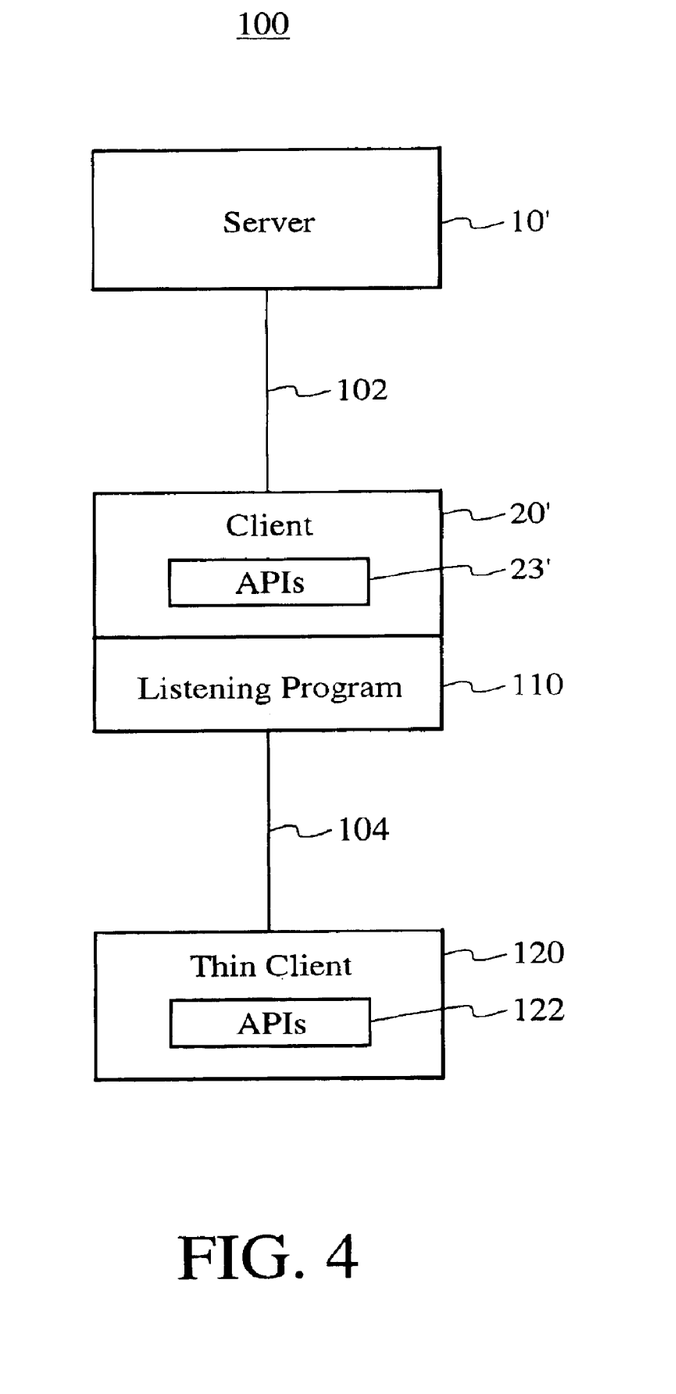
FIG. 4 is a block diagram of a system for servicing a request using a server in accordance with the present invention.

To more particularly illustrate the method and system in accordance with the present invention, refer now to FIG. 4 depicting a block diagram of one embodiment of a system 100 for servicing a request in accordance with the present invention. The system 100 includes portions of conventional client-server software 5, depicted in FIG. 1. Thus, portions of the system 100 are labeled similarly to the conventional client-server software 5.

The system 100 includes a server 10' and a client 20' connected via connection 102. In a preferred embodiment, the client 20' and the server 10' are already in existence and can function with each other. Preferably, the client 20' and the server 10' reside on a single machine. The client 20' includes APIs 23'. The APIs 23' provide a public interface for the client 20'. The APIs 23' can be used to invoke the client 20' from other software. The client 20' can provide a plurality of functions through communication with the server 10'. In a preferred embodiment, these functions include backup and restore of data. The client 20' may also use a first format, for example requiring data to be in the first format for use with the APIs 23'. The server 10' can be on any server platform (not shown) which is compatible with the client 20'. The server 10' might also be compatible with multiple server platforms.

The system 100 also includes a listening program 110 and a thin client 120. The thin client communicates with the listening program via connection 104, which may be a network connection. The thin client 120 communicates with the listening program 110 and the user or software on the client machine on which the listening program 110 resides. The thin client 120 is compatible with at least the client platform for the machine on which the thin client 120 resides. The thin client 120 is also preferably platform independent. The thin client 120 uses a second format and may provide some data processing. For example, the thin client 120 may place data in the second format. The second format used by the thin client 120 is appropriate for providing the data over the network 130. The first format of the client 20' and the second format of the thin client 120 may be the same or different. The thin client 120 provides an interface to the functions for the client 20' residing at a different machine. In one embodiment, the thin client 120 is a graphical user interface used to access the functions of the client 20'. In one embodiment, the thin client 120 is run on a browser (not shown). However, in another embodiment, the thin client 120 is run as an application. In one embodiment, the thin client 120 also includes APIs 122. The APIs 122 may be used by other software (not shown) to invoke the thin client 120. In a preferred embodiment, the thin client 120 can be invoked by software or by a user, for example through a command line or graphical user interface.

The listening program 110 listens for communications from the thin client 120. Preferably, communications from the thin client 120 arrive at the listening program 110 via a network (not shown). The listening program 110 also converts between the first format used by the client 20' and the second format used by the thin client 120'. Therefore, the listening device 110 may convert data from the thin client 120 to a format appropriate for the APIs 23'. The listening program 110 also invokes the client 20', preferably using the APIs 23'. The listening program 110 may also invoke the client 20' in another manner, such as invoking batch-mode through a command line. Through the use of the thin client 120, the listening program 110, the client 20' and the server 10', the system 100 provides at least a portion of the functions available through the client 20' and the server 10'. In a preferred embodiment, the system 100 provides backup and restore, as well as archive and retrieve and hierarchical storage management functions. For example, in one preferred embodiment, the system 100 provides migrate and recall functions. Migrate and recall functions allow data to be sent to and recalled from another machine, such as a server machine while allowing the data to appear to a user as if it resides on the user's machine. Similarly, in a preferred embodiment, the system 100 also provides administrative functions or other server functions or services. For example, in one embodiment, the system 100 allows queries to be processed.

The thin client 120 can be used with an existing client 20' and an existing server 10' through the use of the listening program 110. The thin client 120 can also be made to be compatible with a plurality of client platforms. In a preferred embodiment, this function is achieved by implementing the thin client 120 in a platform independent language such as JAVA. Thus, the system 100 may be made compatible with a plurality of client platforms without incurring the expense of porting the client 20' to the platform and without abandoning the investment in the client 20'. The present invention is particularly useful in networks using a large number of different client platforms because the time and expense of porting the client 20' to the large number of platforms need not be incurred. In addition, the thin client 120 may provide a portion of the functions provided by the client 20' and server 10'. As a result, performance of the system 100 may not be substantially slowed even when the thin client 120 is implemented in a platform independent language. The performance of the system 100 is also good when the client 20' and the server 10' reside on a single machine. In addition, if the thin client 120 provides a limited number of functions, the thin client 120 may be easily be made to work on another platform even if the thin client 120 is not implemented in a platform independent language. Thus, the cost of allowing the client-server software to be compatible with multiple client platforms is reduced. Also in a preferred embodiment, the APIs 23' are packaged with the client 20'. However, nothing prevents the present invention from functioning when the APIs 23' are separate from the client 20'.

Figure 5A:
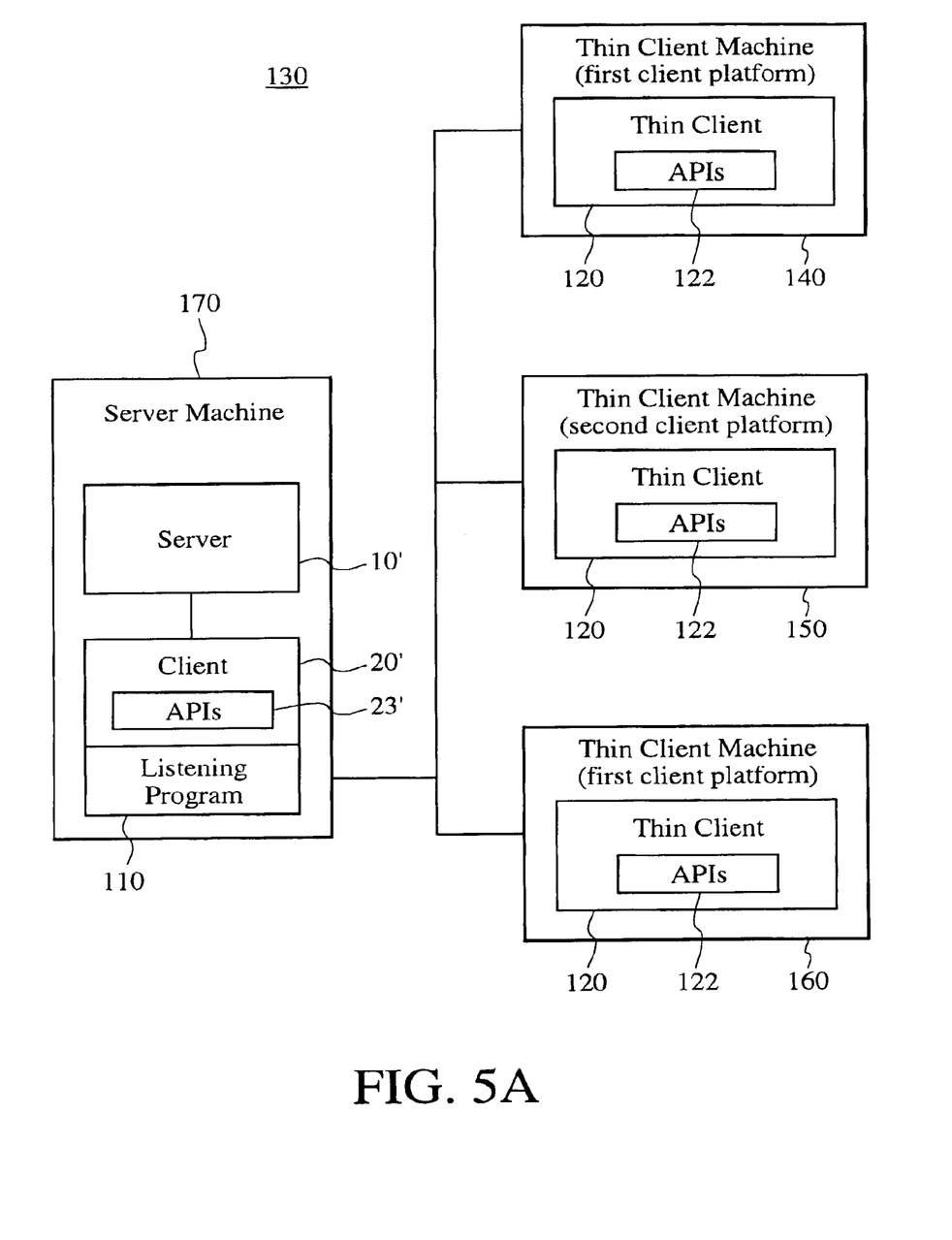
FIG. 5A is a block diagram of one embodiment of a network using the client-server software in accordance with the present invention.
Figure 5B:
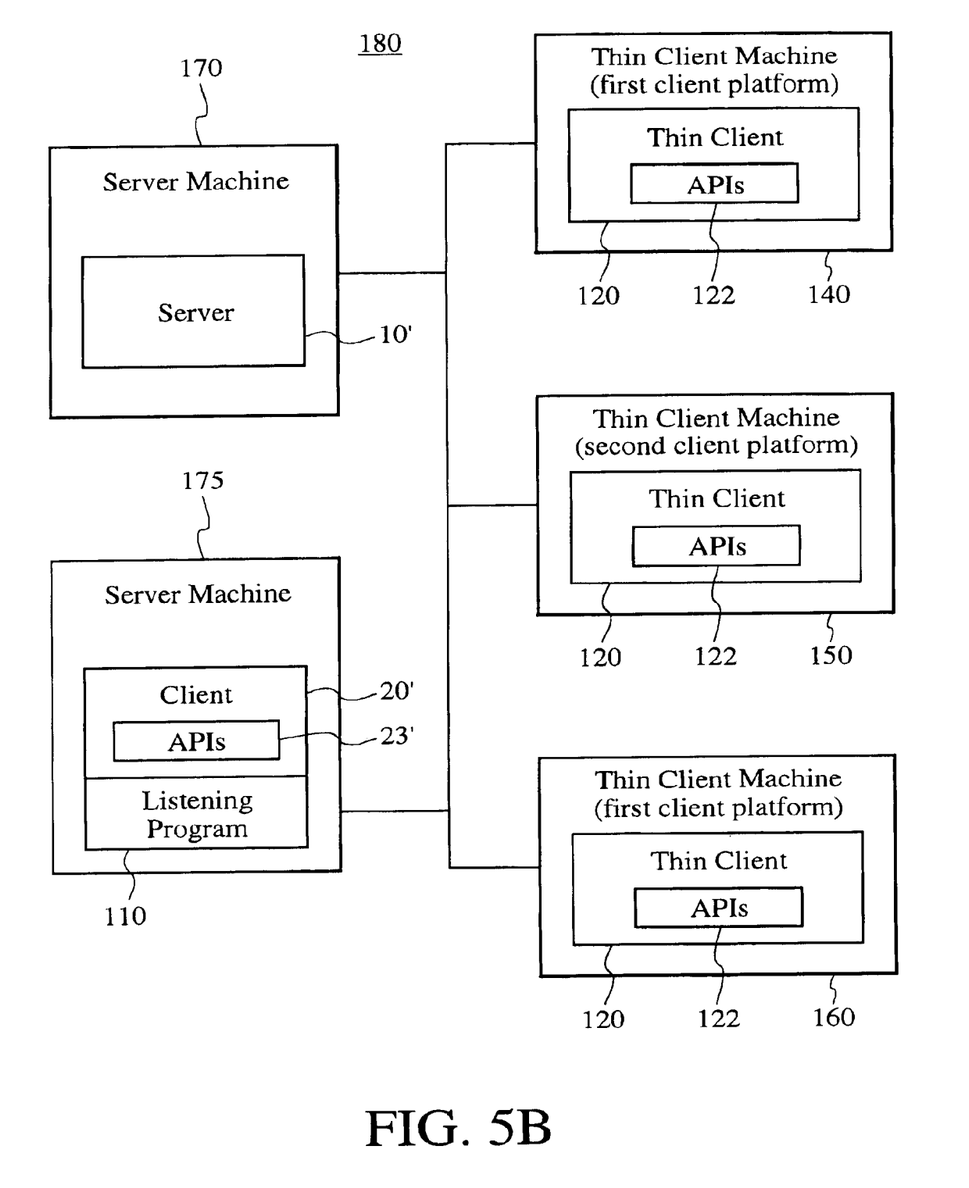
FIG. 5B is a block diagram of another embodiment of a network using the client-server software in accordance with the present invention.

FIGS. 5A and 5B depict embodiments of networks 130 and 180, respectively, using the system 100 in accordance with the present invention. Referring to FIG. 5A, the network 130 includes a server machine 170 and thin client machines 140, 150, and 160. The thin client machines 140, 150, and 160 may be similar to the client machines 22, 25, and 62. The server machine 170 includes the server 10', the client 20', and the listening program 110. In an alternate embodiment, the listening program 110 may be on a different machine from the client 20' and the server 10'. The client 20' still includes APIs 23'. Each thin client machine 140, 150, and 160 includes the thin client 120. Note that the thin client machines 140 and 150 and thin client machine 160 are depicted as having different platforms, a first client platform and a second client platform, respectively. Thus, in a preferred embodiment, the thin client 120 is compatible with a plurality of platforms. In addition, although only two client platforms and three thin client machines 140, 150, and 160 are shown, nothing prevents the present invention from being used with another number of client platforms or another number of client machines. In an alternate embodiment, the thin client may be implemented in a language which is not platform independent, such as C or C++. In such an alternate embodiment, the functions provided via the thin client 120 are preferably restricted.

FIG. 5B depicts another embodiment of the network 180. The network 180 includes thin client machines 140, 150, and 160. The network 180 also includes a first server machine 170 and a second server machine 175. Each thin client machine 140, 150, and 160 includes the thin client 120. Note that the thin client machines 140 and 150 and client machine 160 are depicted as having different platforms, a first platform and a second platform respectively. Thus, in a preferred embodiment, the thin client 120 is compatible with a plurality of platforms. Also in a preferred embodiment, this is accomplished by implementing the thin client 120 in a platform independent language. In addition, although only two client platforms and three thin client machines 140, 150, and 160 are shown, nothing prevents the present invention from being used with another number of client platforms or another number of client machines. In an alternate embodiment, the thin client may be implemented in a language which is not platform independent, such as C or C++. In such an alternate embodiment, the functions provided via the thin client 120 are preferably restricted.

In the network 180, the first server machine 170 includes the server 10'. However, the client 20' and the listening program 110 reside on the second server machine 175. In an alternate embodiment, the listening program 110 may be on a different machine from the client 20'.

Figure 6:
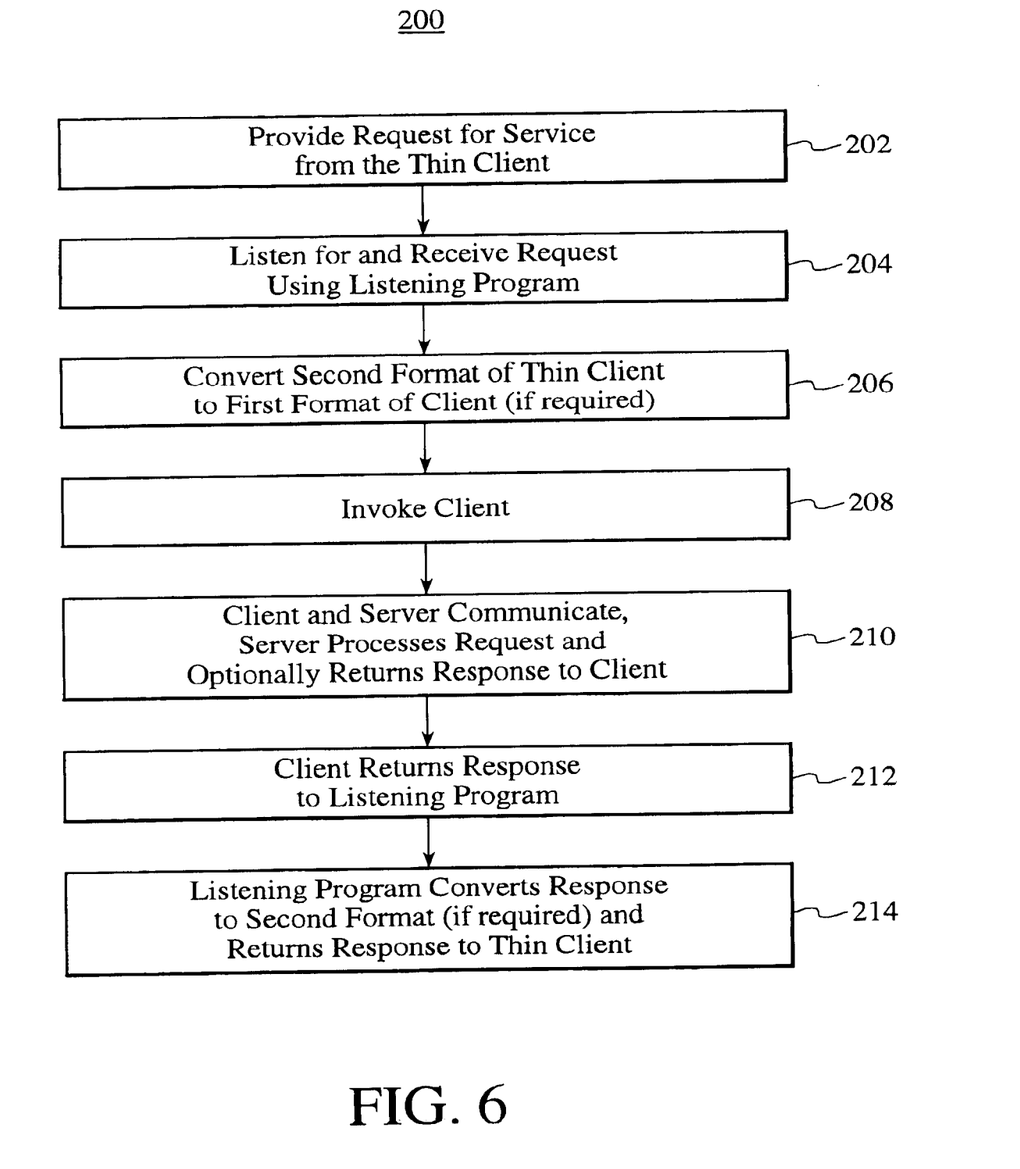
FIG. 6 is a flow chart depicting one embodiment of a method for servicing a request using a server in accordance with the present invention.

FIG. 6 depicts one embodiment of a method 200 in accordance with the present invention for servicing a request using a server. The method 200 is carried out by the system 100 in the networks 130 or 180. A request for service is provided by the thin client 120, via step 202. The request provided in step 202 may also be accompanied by data. The request and data may be in the second format used by the thin client 120. In order to provide the request and the data, the thin client 120 may provide some data processing functions to convert from the format used in the first or second client platform to the second format used by the thin client 120.

The request is listened for and received by the listening program 110, via step 204. If required, the listening program 110 converts the request and the accompanying data from the second format used by the thin client 120 to the first format used by the client 20', via step 206. The listening program 110 then invokes the client 20', via step 208. In one embodiment, the listening program 110 invokes the client 20' using the APIs 23'. Communication between the client 20' and the server 10' and servicing of the request by the server 10' are performed, via step 210. Preferably, the server 20' also provides a response to the client 20' in step 210. Also in a preferred embodiment, step 210 includes conventional interaction between the client 20' and the server 10'. In one embodiment the response may simply be a message indicating the desired service has been performed. If a response is provided, then the client 20' returns the response to the listening program 110, via step 212. The listening program then converts the response if required, and provides the response to the thin client 120, via step 214.

Thus, through the use of the thin client 120 and the listening program 110, at least a portion of the functions provided by the client 20' and the server 10' can be provided to each of the thin client machines 140, 150, and 160. Thus, the client 20' is effectively made compatible with additional client platforms without relinquishing the investment in the client 20' and without expending significant resources to port the client 20' to each new client platform.

Figure 7A:
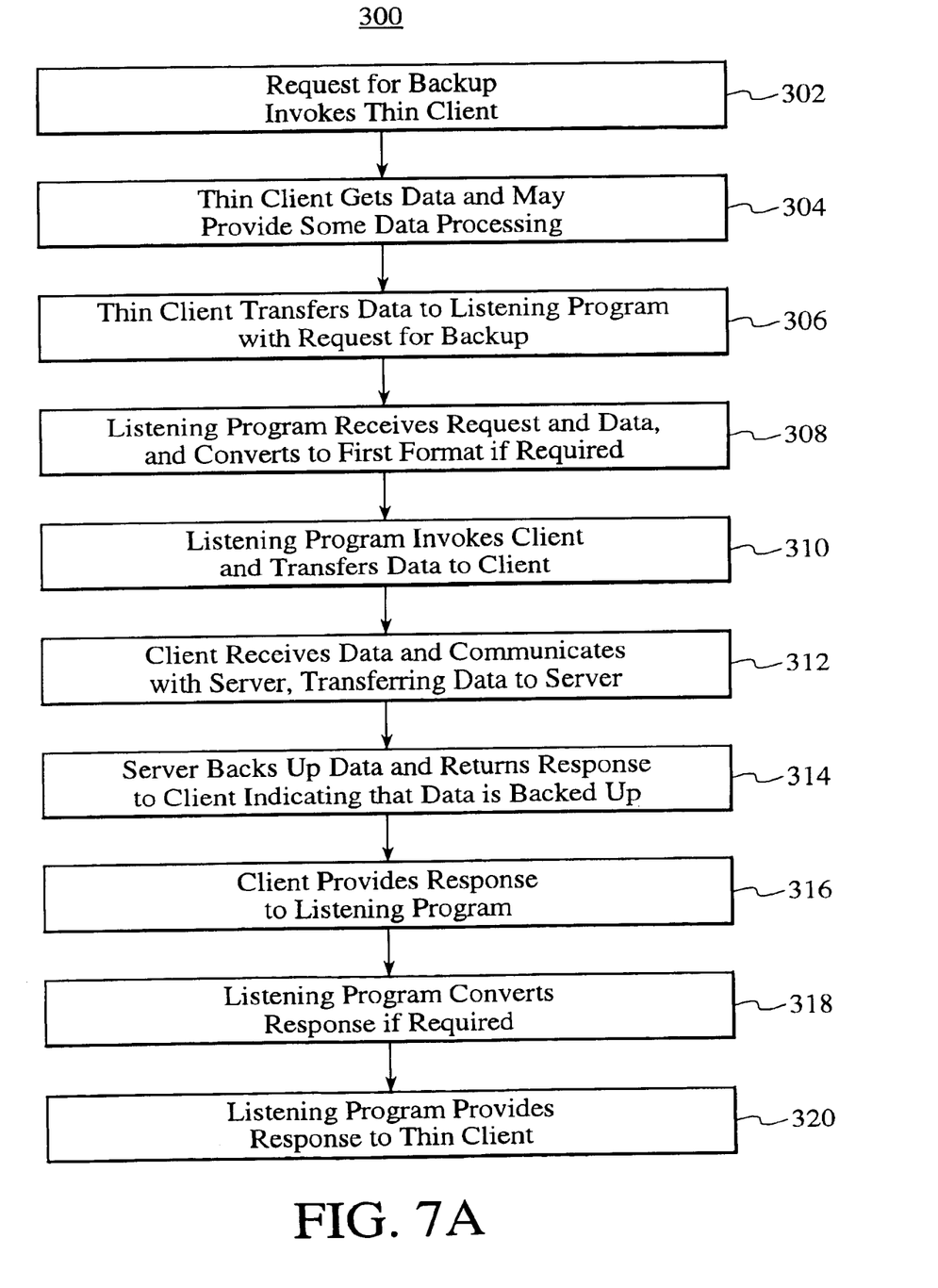
FIG. 7A is a flow chart depicting one method for backing up data in accordance with the present invention.
Figure 7B:
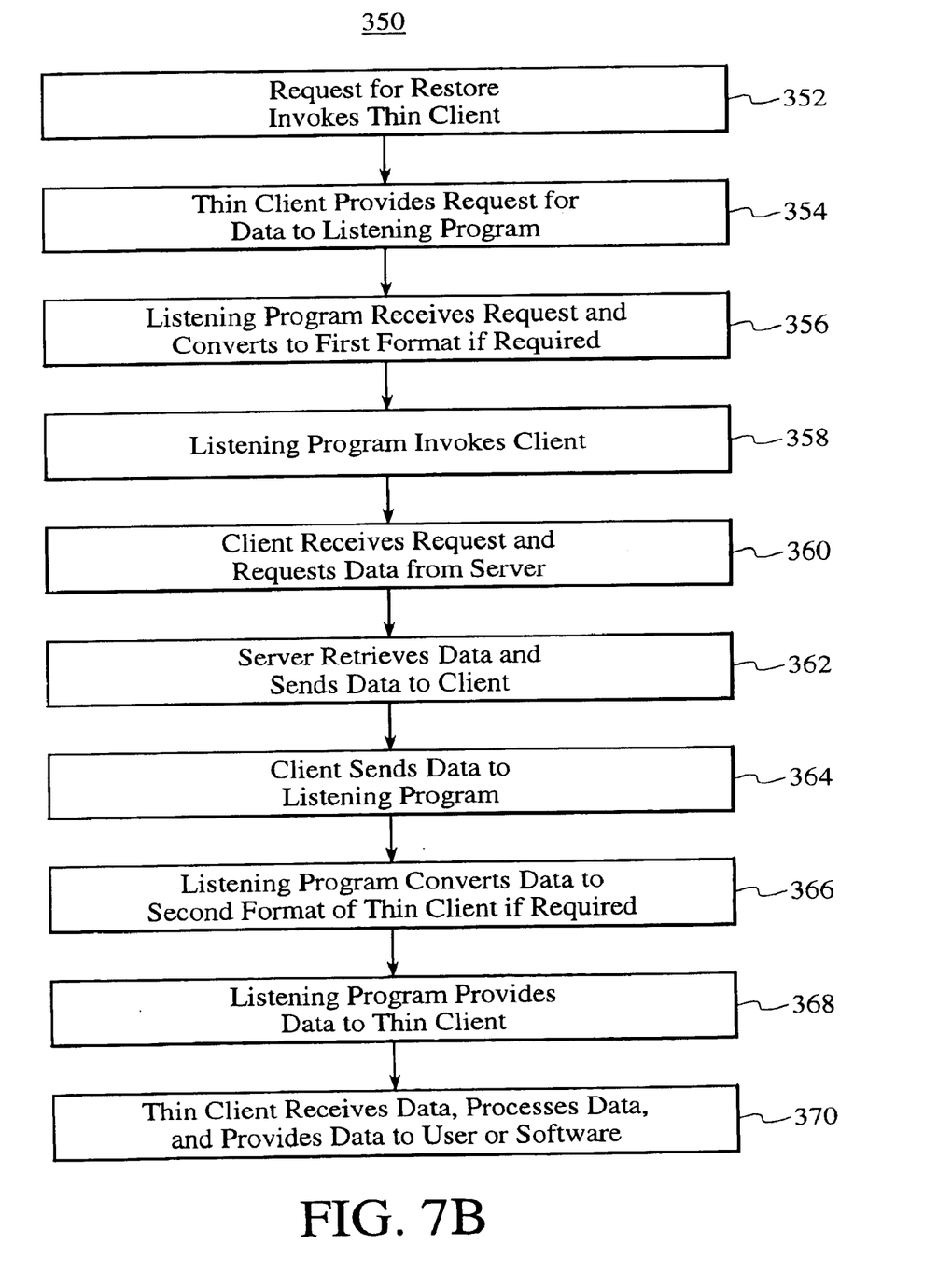
FIG. 7B is a flow chart depicting one method for restoring data in accordance with the present invention.

FIGS. 7A and 7B depict preferred embodiments of methods for servicing a request using a server 20'. FIG. 7A depicts a preferred embodiment of a method 250 for backing up data in accordance with the present invention. FIG. 7B depicts a preferred embodiment of a method 270 for restoring data in accordance with the present invention.

Referring now to FIG. 7A, the thin client 120 on a thin client machine 140, 150, or 160 is invoked by a request to backup data, via step 302. In one embodiment, the request may be made through APIs 122 for the thin client 120. Thus, the thin client 120 may be invoked by other software (not shown) or a user. The thin client 120 then gets the data and may provide some processing of the data to be backed up, via step 304. The thin client 120 then provides a request for a backup and provides the data to be backed up to the listening program 110, via step 306. The listening program 110 receives the request and data, via step 308. Also in step 308, the listening program 110 also converts the request and data to the form used by the client 20' if required. The listening program then invokes the client 20' and transfers the data to the client 20', via step 310. In step 310, the client is preferably invoked using the APIs 23'.

The client 10' receives the data and communicates with the server 20' to request that the server 20' backup the data, via step 312. The client also transfers the data to the server 10' in step 312. The server 10' then backs up the data, via step 314. Also in step 314, the server 10' returns a response to the client 20' indicating that the data has been backed up. The communication between the client 20' and server 10' in steps 312 and 314 is preferably via conventional means. The client 20' transfers the response to the listening program 110, via step 316. The listening program 110 then converts the response to the second format used by the thin client 120, if required, via step 318. The listening program 110 sends the converted response to the thin client 120, via step 320.

FIG. 7B depicts the method 350 for restoring data which has been backed up by the server 10'. The thin client 120 on a thin client machine 140, 150, or 160 is invoked by a request to restore data, via step 352. In one embodiment, the request may be made through APIs 122 for the thin client 120. Thus, the thin client 120 may be invoked by other software (not shown) or a user. The thin client 120 then provides a request for restoring the data to the listening program 110, via step 354. The listening program 110 receives the request, via step 356. Also in step 356, the listening program 110 converts the request to the form used by the client 20' if required. The listening program then invokes the client 20', via step 358. Preferably step 338 is performed using the APIs 23'.

The client 10' receives the request and communicates with the server 20' to request that the server 20' restore the data, via step 360. The server 10' then retrieves the data, via step 362. Also in step 362, the server 10' provides the data to the client 20'. The communication between the client 20' and server 10' in steps 360 and 362 is preferably via conventional means. The client 20' transfers the data to the listening program 110, via step 364. The listening program 110 then converts the data to the second format used by the thin client 120, if required, via step 366. The listening program 110 sends the converted data to the thin client 120, via step 368. The thin client receives the data and may process the data, via step 370. Also in step 370, the thin client 120 passes the data to the requesting software or displays the data to the user. Thus, data on thin client machines 140, 150, and 160 can be backed up and restored using the methods 300 and 350, respectively.

A method and system has been disclosed for more easily providing client-server software which can function on other client platforms. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for servicing a request using a server, said server being capable of communicating with a client, said client providing a plurality of functions through communication with said server which services said request, the client being compatible with a particular client platform, said system comprising:

a thin client for providing said request, said thin client being compatible with at least one client platform and residing on a client machine; and a listening program for listening for said request from the thin client and invoking said client in response to said request, said request being serviced by communication between said client and said server, said listening program residing on a server machine;

wherein a portion of said plurality of functions may be provided on said client machine using said at least one client platform using said thin client to allow said client to be used with said at least one client platform;

wherein said system includes a data storage system, wherein said request relates to storage of data using said server, wherein said data is transferred between the thin client and the client, wherein said plurality of functions include a migrate or recall or a backup or restore of said data;

wherein said thin client converts said data between said particular client platform and said at least one client platform; and wherein said client and said server both reside on said server machine.

2. The system of claim 1 wherein the client utilizes a first format and the thin client utilizes a second format; and wherein the listening program further converts between the first format and the second format.

3. The system of claim 1 wherein the thin client is further compatible with a plurality of client platforms; and wherein the request may be from one of the plurality of client platforms.

4. The system of claim 3 wherein the thin client is implemented in JAVA.

5. The system of claim 1 wherein the client further includes at least one application program interface (API); and wherein the listening program invokes the client through the at least one API.

6. The system of claim 1 wherein the thin client further ensures that the data exists in the second format and provides the data to the listening program.

7. The system of claim 1 wherein the data includes at least one file; and wherein the plurality of functions further includes archiving the at least one file.

8. The system of claim 7 wherein the plurality of functions further include retrieving the at least one file.

9. The system of claim 1 wherein the thin client is executed by a browser.

10. The system of claim 1 wherein the thin client is implemented in C.

11. A method for servicing a request using a server, said server being capable of communicating with a client, said client providing a plurality of functions through communication with said server which services said request, said client being compatible with a particular client platform, the method comprising the steps of:

providing a thin client, said thin client for providing said request, said thin client being compatible with at least one client platform and residing on a client machine; and providing a listening program, said listening program for listening for a communication from said thin client, and invoking said client in response to the request, said request being serviced by communication between said client and said server, said listening program residing on a server machine;

wherein a portion of said plurality of functions may be provided on said client machine using said at least one client platform using said thin client to allow the client to be used with said at least one client platform;

wherein said server is part of a data storage system, wherein the request relates to storage of data using said server, wherein said data is transferred between the thin client and the client, and wherein said plurality of functions includes a migrate or recall or a backup or restore of said data;

wherein said thin client converts said data between the particular client platform and the at least one client platform; and wherein said client and said server both reside on said server machine.

12. The method of claim 11 wherein the client utilizes a first format and the thin client utilizes a second format; and wherein the listening program further converts between the first format and the second format.

13. The method of claim 11 wherein the thin client is further compatible with a plurality of client platforms; and wherein the portion of the plurality of functions may be provided on the plurality of client platforms.

14. The method of claim 13 wherein the thin client providing step further includes the step of:
providing the thin client implemented in JAVA.

15. The method of claim 11 wherein the client further includes at least one application program interface (API); and
wherein the listening program invokes the client through the at least one API.

16. The method of claim 11 wherein the thin client further ensures that the data exists in the second format and provides the data to the listening program.

17. The method of claim 11 wherein the data includes at least one file; and wherein the plurality of functions further include archiving the at least one file.

18. The method of claim 17 wherein the plurality of functions further include retrieving the at least one file.

19. The method of claim 11 wherein the thin client providing step further includes the step of:
providing the thin client implemented in C or C++.

20. The computer-readable medium of claim 19 wherein the thin client is further compatible with a plurality of client platforms; and
wherein the request may be from one of the plurality of client platforms.

21. The computer-readable medium of claim 20 wherein the client further includes at least one application program interface (API); and wherein the instruction for invoking the client further includes instructions for:
using the listening program to invoke the client through the at least one API.

22. A method for servicing a request for a function performed by a server, said the server capable of communicating with a client, said client providing a plurality of functions through communication with said server which services said request, being compatible with a particular client platform, and utilizing a first format, the method comprising the steps of:
(a) utilizing a thin client compatible with a plurality of client platforms to provide said request, said thin client using a second format and residing on a client machine;
(b) listening for the request on a listening program coupled with said thin client and residing on a server machine;
(c) converting from said first format to said second format;
(d) invoking the client by said listening program in response to said request; and
(e) communicating between said client and said server to service said request;
wherein a portion of said plurality of functions may be provided on said plurality of client platforms, thereby allowing said client to be used with the client machine using said at least one client platform;
wherein said server is part of a data storage system, wherein said request relates to storage of data using said server, wherein said data is transferred between the thin client and the client, and wherein said request includes a migrate or recall or a backup or restore of said data;
wherein said thin client converts said data between said particular client platform and said at least one client platform; and
wherein said client and said server both reside on said server machine.

23. The method of claim 22 wherein the client further includes at least one application program interface (API) and wherein the client invoking step (d) further includes the step of:
(d1) using the listening program to invoke the client through the at least one API.

24. The method of claim 22 wherein the client and the server both reside on the server machine remote from the client machine on which the thin client resides.

25. A computer-readable medium having a program for servicing a request using a server, said server being capable of communicating with a client, said client providing a plurality of functions through communication with said server which services the request, said client being compatible with a particular client platform, the program containing instructions for:
providing a thin client compatible with at least one client platform and residing on a client machine; and
providing a listening program for listening for a communication from said thin client, and invoking said client in response to said request, said request being serviced by communication between said client and said server, said listening program residing on a server machine;
wherein a portion of said plurality of functions may be provided on said client machine using said at least one client platform, thereby allowing said client to be used with said at least one client platform;
wherein said server is part of a data storage system, wherein said request relates to storage of data using said server, wherein said data is transferred between the thin client and the client, and wherein said plurality of functions include a migrate or recall of a backup or restore of said data;
wherein said thin client converts the data between said particular client platform and said at least one client platform; and
wherein said client and said server both reside on said server machine.

26. The computer-readable medium of claim 25 wherein the client and the server both reside on the server machine remote from the client machine on which the thin client resides.

27. A computer-readable medium containing a program for servicing a request for a function performed by a server, said server being capable of communicating with a client, said client providing a plurality of functions through communication with said server which services the request, said client being for use with a particular client platform, the program including instructions for:
listening for said request from a thin client, said thin client being compatible with a plurality of client platforms and residing on a client machine;
invoking said client in response to said request to allow said client and server to communicate to service said request, said request being serviced by communication between said client and said server; and
providing said thin client with a response from said service of the request, thereby allowing said client to be used with the plurality of platforms;
wherein said server is part of a data storage system, wherein said request relates to storage of data using said server, wherein said data is transferred between the thin client and the client, and wherein the request includes a migrate or recall or a backup or restore of the data; and wherein said thin client converts said data between said particular client platform and said at least one client platform;

wherein a listening program performs the listening and invoking instructions; and wherein said client and said server both reside on said server machine.

28. The computer-readable medium of claim 27 wherein the client and the server both reside on the server machine remote from the client machine on which the thin client resides.

29. A computer-readable medium containing a program for servicing a request for a function performed by a server, said server being capable of communicating with a client, said client providing a plurality of functions and being compatible with a particular client platform, the program including instructions for:

provviding said request to a listening program, said request capable of being from a plurality of client platforms, said client communicating with said server to service said request, said listening program residing on a server machine and being capable of invoking said client, said request being serviced by communication between said client and said server; and receiving a reply from the listening program, said reply being in response to said service of said request;

wherein a portion of the plurality of functions may be provided on said plurality of client platforms to allow said client to be used with said plurality of client platforms;

wherein said server is part of a data storage system, wherein said request relates to storage of data using said server, wherein said data is transferred between the thin client and the client, and wherein the plurality of functions include a migrate or recall or a backup or restore of the data;

wherein said thin client converts data between the particular client platform and said at least one client platform; and wherein said client and said server both reside on said server machine.

30. The computer-readable medium of claim 29 wherein the client and the server both reside on the server machine remote from the client machine on which the thin client resides.

* * * * *